Oct. 21, 1924.

E. A. BARNES 1,512,190

BEARING AND METHOD OF MAKING THE SAME

Filed Dec. 28, 1923

Inventor:
Edward A. Barnes,
by
His Attorney

Patented Oct. 21, 1924.

1,512,190

UNITED STATES PATENT OFFICE.

EDWARD A. BARNES, OF FORT WAYNE, INDIANA, ASSIGNOR TO GENERAL ELECTRIC COMPANY, A CORPORATION OF NEW YORK.

BEARING AND METHOD OF MAKING THE SAME.

Application filed December 28, 1923. Serial No. 683,256.

*To all whom it may concern:*

Be it known that I, EDWARD A. BARNES, a citizen of the United States, residing at Fort Wayne, in the county of Allen, State of Indiana, have invented certain new and useful Improvements in Bearings and Methods of Making the Same, of which the following is a specification.

My invention relates to bearings for rotating shafts, and has for its object to provide an improved composite bearing structure and an improved method of making the same.

In the past the great majority of bearings for electric motors has been made by the casting process which consists in pouring the molten bearing metal into an outer shell and permitting it to solidify. Bearing metals when cast in this manner are characterized by a more or less granular structure which is short and brittle. This, therefore, necessitates considerable care and skill on the part of the operator in order to insure that the bearing metal after being cast is of proper character, suitable for a bearing surface, and not changed to an unsuitable character by the heating and cooling of the metal when cast. After the metal is cast in the outer shell there is the further operation which must be performed to make the bearing suitable for use, that is, the bearing surface must be finished off and the oil grooves cut therein.

It has been proposed to make composite bearings by pressing an outer shell and an inner lining of cold drawn metal together to produce a bearing having a bearing surface of known characteristics. Bearings made by this latter method, if provided with oil grooves, must of necessity have a lining of considerable thickness to permit oil grooves of sufficient depth to be cut into the lining.

In accordance with my invention, I provide an outer shell or casing with grooves on its inner surface and expand a relatively thin lining of suitable bearing material into the shell and grooves for the purpose of forming the bearing.

Other features of novelty which characterize my invention are pointed out with particularity in the claims annexed to and forming a part of this specification.

Figure 1:
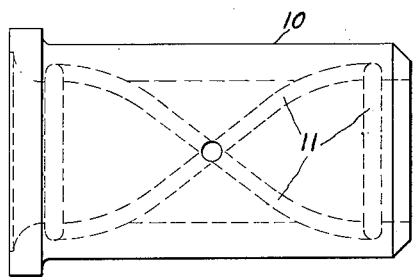
Figure 2:
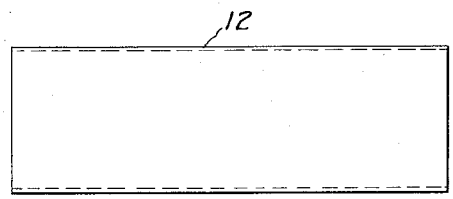
Figure 3:
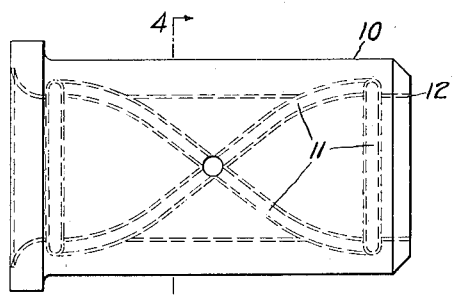
Figure 4:
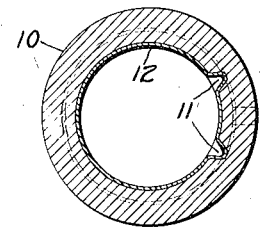
Figure 5:
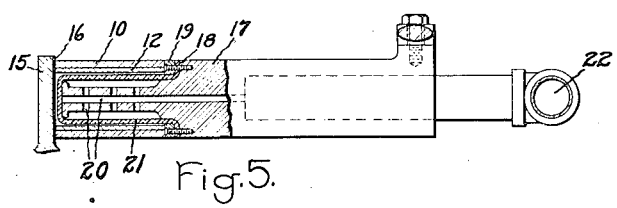

For a better understanding of my invention, reference may be had to the following description taken in connection with the accompanying drawing, in which Fig. 1 is a side view of the shell used in constructing a bearing in accordance with my invention; Fig. 2 is a side view of the inner lining; Fig. 3 is a side view of the completed bearing; Fig. 4 is a sectional view of the completed bearing taken along lines 4—4 of Fig. 3, and Fig. 5 shows one type of expanding means which can be used to carry out the process of my invention.

As illustrated, the bearing made in accordance with my invention is composed of an outer shell or casing 10 having grooves and recesses 11 formed on its inner surface and an inner tube or lining 12 of suitable bearing material expanded therein. The outer shell 10 can be of any suitable material either cast or wrought. If cast, the grooves 11 can be formed during the casting operation. These grooves and recesses 11 are made of sufficient depth and width to permit the lining 12 when expanded to conform to their contour and allow sufficient space between the surface of the lining 12 and the shaft, to form oil passages.

After the shell 10 has been prepared as suggested above, the lining 12 is inserted and expanded into intimate contact with the inner surface of the outer shell 10. The lining 12 by this operation is caused to conform to the contour of the inner surface of the shell 10 and provide a bearing surface having oil grooves. By this method of manufacture, the oil grooves will be formed with rounded edges which will prevent them from scraping the oil from the journal.

The expanding operation can be carried out by the use of expanding mandrels, compressed air, hydraulic pressure or any other simple mechanical expanding means. In Fig. 5, of the drawing, I have illustrated a special means for expanding the lining 12 into the casing 10. An abutment 15 is provided with a soft rubber or similar facing 16 against which the shell 10 and lining 12 are placed. A plunger 17 projects into the lining 12 and is provided with a shoulder 18 having a soft rubber gasket 19 which completely seals the interior of the lining 12. The plunger 17 is provided with an opening 20 through which an expanding fluid, such as water, can enter from the pipe 22 into the gum rubber bulb 21 which surrounds the end of the plunger 17. This bulb 21 is adapted, when expanded, to force the lining 12 into intimate contact with the shell 10. After the lining 12 has been expanded into the shell 10 and the pressure is released the bulb 21 will contract and it can then be withdrawn from the completed bearing and be ready to be inserted into the next bearing and perform the same duty.

Since the lining 12 is expanded into the grooves and recesses 11, they will serve the double function of anchoring the lining metal 12 to the shell 10 and at the same time produce the desired oil passages on the bearing surface. The lining 12 can be composed of any suitable bearing metal. Some of the metals which I have found to be satisfactory are a copper base alloy, composed of 90% copper, 5% tin and 5% lead; a tin base alloy, composed of 89% tin, 3.5% copper and 7.5% antimony; and a lead base alloy composed of 78% to 80% lead, 15 to 18% antimony and 3.5% to 6% tin. Metals of the above class can be obtained in the desired shape, in the open market, or can be produced by working and drawing the metal over arbors and through dies to form them to the desired shape and thickness. This working and drawing elongates the granular structure of the metal and makes it fibrous, close grained, homogeneous and tough, and, therefore, adapted to be expanded into the grooves 11 of the shell 10 to form the oil grooves.

By my invention there is produced without waste, economically and efficiently, a superior composite bearing comprising an outer shell and an inner lining of uniform thickness fixed together permanently by the pressure to which they are subjected in expanding the inner lining into position. My method eliminates the necessity for heating, welding, brazing or soldering the metal, together with the internal strains, distortions and irregularities incident to such operations. Moreover, these bearings of composite character can be made by combining metals having the different characteristics required for the duty of the lining in relation to a journal, and for the duty of the shell in relation to the lining and to the holding means.

My invention may be embodied in many other forms than that shown and described and I, therefore, do not wish to be restricted to the precise embodiment shown or method described, but intend to cover by the appended claims all changes and modifications which are within the scope of my invention and will be apparent to those skilled in the art.

What I claim as new and desire to secure by Letters Patent of the United States, is:—

1. The method of making a composite bearing which consists in providing an outer shell with grooves on its inner surface to form oil passages, and cold pressing a lining of bearing metal, having a uniform thickness, into conformity with the inner surface of said shell and grooves.

2. The method of making a composite bearing which consists in cutting grooves in a rigid outer shell and expanding a bearing metal lining, of uniform thickness, into conformity with the inner surface of said outer shell and grooves, said lining having a thickness less than the depth of said grooves.

3. The method of making a composite bearing which consists in providing an outer seamless shell with grooves on its inner surface and expanding a seamless tube of bearing metal, having a uniform thickness, into conformity with the inner surface of said outer shell to form a bearing surface having oil grooves therein.

4. The method of making a composite bearing which comprises cold pressing together an outer shell having grooves on its inner surface and an inner tube of different metal, of uniform thickness, and causing said inner tube to conform with the inner surface of said outer shell to secure the parts together and form a bearing having oil grooves.

5. A bearing for rotating shafts comprising an outer shell having grooves formed therein, and a metal lining within said outer shell conforming to the inner surface of said outer shell and grooves, said lining having a substantially uniform thickness.

6. A composite bearing comprising an outer rigid shell having grooves formed therein, and a lining of uniform thickness within and conforming to the inner surface of said shell to form a bearing surface having oil grooves therein.

7. A composite bearing comprising an outer rigid shell having grooves formed therein, and a lining of uniform thickness within said shell conforming with said grooves to form oil passages in said bearing.

In witness whereof, I have hereunto set my hand this 26th day of December, 1923.

EDWARD A. BARNES.